United States Patent
Staub et al.

(10) Patent No.: US 8,187,771 B2
(45) Date of Patent: May 29, 2012

(54) MULTI-LAYER BODY WITH VOLUME HOLOGRAM

(75) Inventors: René Staub, Hagendorn (CH); Wayne Robert Tompkin, Baden (CH); Andreas Schilling, Hagendorn (CH); Ludwig Brehm, Adelsdorf (DE); Achim Hansen, Zug (CH)

(73) Assignee: OVD Kinegram AG, Zug (CH)

( * ) Notice: Subject to any disclaimer, the term of this patent is extended or adjusted under 35 U.S.C. 154(b) by 678 days.

(21) Appl. No.: 12/226,080

(22) PCT Filed: Apr. 5, 2007

(86) PCT No.: PCT/EP2007/003091
§ 371 (c)(1),
(2), (4) Date: Nov. 3, 2008

(87) PCT Pub. No.: WO2007/115785
PCT Pub. Date: Oct. 18, 2007

(65) Prior Publication Data
US 2009/0162756 A1    Jun. 25, 2009

(30) Foreign Application Priority Data
Apr. 6, 2006 (DE) .................. 10 2006 016 139

(51) Int. Cl.
*G03H 1/02* (2006.01)
(52) U.S. Cl. .................. 430/2; 430/1; 430/321; 359/12; 359/25
(58) Field of Classification Search .................. None
See application file for complete search history.

(56) References Cited

U.S. PATENT DOCUMENTS

| 4,304,809 | A | * | 12/1981 | Moraw et al. | 428/195.1 |
|---|---|---|---|---|---|
| 4,575,192 | A | * | 3/1986 | Duthie et al. | 359/12 |
| 5,003,915 | A | * | 4/1991 | D'Amato et al. | 118/46 |
| 5,032,003 | A | * | 7/1991 | Antes | 359/567 |
| 5,101,184 | A | | 3/1992 | Antes | |
| 5,104,471 | A | * | 4/1992 | Antes et al. | 156/233 |
| 5,164,227 | A | * | 11/1992 | Miekka et al. | 427/162 |
| 5,379,131 | A | | 1/1995 | Yamazaki | |
| 6,369,947 | B1 | * | 4/2002 | Staub et al. | 359/574 |
| 6,417,968 | B1 | | 7/2002 | Staub et al. | |
| 6,602,578 | B1 | * | 8/2003 | Tompkin et al. | 428/156 |
| 6,747,768 | B1 | | 6/2004 | Knocke et al. | |
| 6,975,438 | B2 | | 12/2005 | Schilling et al. | |
| 7,265,904 | B2 | | 9/2007 | Schilling et al. | |

(Continued)

FOREIGN PATENT DOCUMENTS

AU     2004249864     * 12/2004

(Continued)

*Primary Examiner* — Martin Angebranndt
(74) *Attorney, Agent, or Firm* — Hoffmann & Baron, LLP

(57) ABSTRACT

Described is a process for the production of a multi-layer body having a volume hologram with at least two different items of image information, wherein a photosensitive layer (46) of the multi-layer body is directly or with the interposition of a transparent optical medium (44s, 45) brought into contact with the front side of a master (44), in which interlaced regions with different asymmetrical surface structures or kinoform structures are shaped, which embody the at least two different items of image information. The photosensitive layer (46) and the master are exposed with a coherent light beam (47) whereby a volume hologram is formed in the photosensitive layer (46). Also described are a master for the production of the multi-layer body and a security element having said multi-layer body.

32 Claims, 13 Drawing Sheets

U.S. PATENT DOCUMENTS

| | | | |
|---|---|---|---|
| 7,719,733 B2 | 5/2010 | Schilling et al. | |
| 2003/0124435 A1* | 7/2003 | Rich et al. | 430/1 |
| 2004/0239099 A1* | 12/2004 | Tompkin et al. | 283/74 |
| 2008/0286500 A1* | 11/2008 | Sussner et al. | 428/13 |

FOREIGN PATENT DOCUMENTS

| | | | |
|---|---|---|---|
| AU | 2004285697 | * | 5/2005 |
| CA | 1124122 | * | 5/1982 |
| DE | 10129939 | | 1/2003 |
| DE | 10328760 | | 1/2005 |
| EP | 1168111 A2 | | 1/2002 |
| EP | 1217469 A2 | | 6/2002 |
| EP | 1187728 B1 | | 12/2003 |
| EP | 1511636 A1 | | 12/2003 |
| JP | 03129382 | | 6/1991 |
| JP | 03148687 | | 6/1991 |
| JP | 10-55129 | | 2/1998 |
| WO | WO 99/38038 | | 7/1999 |
| WO | WO 03/099581 | | 12/2003 |
| WO | WO2005042268 | | 5/2005 |
| WO | WO2005050627 | | 6/2005 |
| WO | 2005/100096 | * | 10/2005 |

\* cited by examiner

US 8,187,771 B2

MULTI-LAYER BODY WITH VOLUME HOLOGRAM

This application claims priority based on an International Application filed under the Patent Cooperation Treaty, PCT/EP2007/003091, filed on Apr. 5, 2007 and German Application No. DE 102006016139.4-51, filed on Apr. 6, 2006.

BACKGROUND OF THE INVENTION

The invention concerns a process for the production of a multi-layer body having a volume hologram, a master for the production of the volume hologram and a security element having the multi-layer body.

Holograms are used as security elements for protecting security documents such as banknotes, identity cards or passports, security cards or the like to achieve a high level of forgery-proofness. For mass-produced items, surface holograms are frequently used, which on the one hand do not produce an optimum image impression and which on the other hand can be copied by copying the shape of the surface relief.

Volume holograms, also referred to as white light holograms or reflection holograms, are based on light diffraction at what are referred to as the Bragg planes of a transparent layer which has local differences in refractive index and they produce a brilliant image impression. They cannot be copied by shaping of a surface relief.

It will be noted however that simultaneously writing two different items of image information into a volume hologram gives rise to weak-light and/or blurred reproduction in the regions in which the two items of information are in overlapping relationship. That can be avoided if two separate holograms are arranged one over the other. A disadvantage in that respect however is on the one hand the increased thickness—volume holograms are of a thickness which is a multiple of the light wavelength used to produce them—and the high demands in terms of register accuracy of the volume hologram layers.

EP 1 187 728 B1 describes a process which provides that a transmission hologram and a reflection hologram are respectively recorded in a hologram layer and then the two hologram layers are laminated on to each other.

EP 1 217 469 A2 discloses a process of coating a surface relief hologram with a photosensitive layer and producing a volume hologram by means of the contact process.

EP 1 511 636 A1 describes a process in which a volume hologram is produced by an optical copying operation from a master with a surface relief, the surface relief being a hologram.

Such volume holograms are admittedly more forgery-proof than the master hologram, but they are optically no higher in quality than a surface hologram.

SUMMARY OF THE INVENTION

Now, the object of the invention is to provide a process, suitable for mass production, for the production of a volume hologram, which permits brilliant reproduction of two or more separate items of image information, as well as a master for the production of the volume hologram.

The object of the invention is attained by a process for the production of a multi-layer body having a volume hologram with at least two different items of image information, wherein it is provided that a photosensitive layer of the multi-layer body is brought into contact directly or with the interposition of a transparent optical medium with the front side of a master in which there are formed interlaced regions with at least two different surface structures which contain the at least two different items of image information, wherein one of the surface structures has an asymmetrical relief structure or a kinoform structure; the photosensitive layer and the master are exposed with a coherent light beam; and the volume hologram introduced into the photosensitive layer in that way is fixed by hardening of the photosensitive layer.

The object is further attained by a master for the production of a volume hologram having at least two different items of image information in the optical contact process, wherein it is provided that shaped in a master layer of the master are interlaced regions having at least two different surface structures which contain the at least two different items of image information, wherein one of the surface structures has an asymmetrical relief structure or a kinoform structure.

The object is further attained by a transparent layer with a non-homogeneous refractive index, in which the nodes of the Bragg planes of a volume hologram are formed by a refractive index variation, wherein the volume hologram contains at least two different items of image information as a holographic image of at least two interlaced different surface structures, wherein one of the surface structures has an asymmetrical relief structure or a kinoform structure.

The process according to the invention is distinguished in that the volume hologram is produced by an optical contact copy of a master in which interlaced regions with different asymmetrical surface structures or kinoform structures, which contain different items of image information, are formed.

The regions can be interlaced in different ways. They can involve for example interlaced raster grids, for example line grids. In that case the one region can reproduce for example an item of text information and the other region an item of image information. It can however also be provided that the one region affords an item of information and the other region forms the background surroundings from which the information stands out. The information can be for example a logo which appears light against a dark background in the one viewing position and dark against a light background in the other viewing position. It can therefore be provided that a change from a positive representation to a negative representation and vice-versa occurs when the volume hologram is tilted or moved. Furthermore the regions can be such that the one region forms the edge of the other region. Thus the one region can for example reproduce the border of an alphanumeric character and the other region can reproduce the alphanumeric character itself.

The asymmetrical surface structures are preferably periodic structures which deflect or diffract the incident light into preferred directions. Brilliant representations are produced in that way. Equally the surface structures can also be in the form of what are referred to as kinoform structures which are also known as zone lenses or Fresnel zone plates. These involve annular structures in which the zones differ in their transparency and/or in their optical path length. In the former case the light is diffracted at the annular gaps and intensified by constructive interference at focal points. In the latter case the light is deflected in a preferred direction by the differing phase shift at the rings. The kinoform structures, specifically for a wavelength, can highly efficiently diffract the coherent light into precisely defined angle regions. The kinoform structures are therefore also structures which concentrate the deflected light in a preferred direction and in that way produce brilliant representations.

The clean separation of the different items of image information by virtue of nested regions with different asymmetrical surface structures or kinoform structures in the master and holographic imaging of the master in a volume hologram by means of optical contact copying means that comparatively low demands are made on the reproduction procedure. The processes required for production of the master also impose comparatively low levels of demand. The master can be for example in the form of a film body having a thermoplastic or UV hardenable master layer in which the asymmetrical surface structures or kinoform structures are shaped. It is therefore possible to provide master copies which can be used just once for optical contact copying and which can be produced for example in a roll-to-roll process. The photosensitive material can be either liquid, viscous or solid. The viscosity of the photosensitive material can be increased by preliminary exposure with UV light. As tests have shown that operation is temperature-dependent. It can therefore be provided for example that the photosensitive material is processed at a temperature of 30° C. Following the optional preliminary UV exposure step which precedes exposure with the laser the material which is pre-treated with UV light is of the optimum viscosity for further processing.

The security element according to the invention is distinguished by an optimally produced volume hologram, the thickness of which is limited downwardly only by the optical laws relating to formation of volume holograms. The security element can therefore also be inserted into carriers which are subjected to a flexural loading during use as is the case for example with banknotes. Because the volume hologram is produced in a transparent material the unexpected optical effect of producing non-transparent reflecting images in a transparent window is particularly striking.

It can be provided that the at least one other surface structure has an asymmetrical relief structure or a symmetrical relief structure or a relief structure with a varying period or a random relief structure or a pseudo-random relief structure.

It can further be provided that the surface structures of the master which do not contain any image information are in the form of a motheye structure and/or in the form of a mirror and/or in the form of a matt structure and/or in the form of a scatter grating.

In that way the items of information are particularly clearly emphasised against the background.

An advantageous configuration provides that the at least two surface structures are in the form of asymmetrical surface structures.

It can be provided that the at least two asymmetrical surface structures are provided with a different relief structure and/or have a different k-vector. The asymmetrical relief structure can typically be a sawtooth-shaped structure in which the rising edge includes an acute angle of inclination with the surface normal of the surface and the falling edge extends in the surface normal, that is to say forms a vertical edge. The relief structure can therefore differ in terms of the angle of inclination. It can further differ in respect of the spacing of two successive raised portions. The surface structures can also differ from each other in their k-vectors, that is to say in the propagation direction of the diffracted light wave.

It can further be provided that a plurality of coherent light beams of differing wavelength and/or with a differing direction of incidence and/or polarisation are used.

As tests have clearly demonstrated the diffraction efficiency of the volume holograms with multiple beam exposure is lower than the diffraction efficiency of the volume holograms with single-beam exposure, in particular for fluid-like photosensitive material which has a high degree of mobility of its components.

It can further be provided that the coherent light beam passes through the photosensitive layer and is deflected at least at the asymmetrical surface structures and/or kinoform structures of the master, wherein no air layer is provided between the photosensitive layer and the master. In that way the coherent light beam which passes into the photosensitive layer forms the object wave and the coherent light beam issuing from the photosensitive layer and the coherent light beam diffracted or reflected by the asymmetrical surface structure or the kinoform structure of the master into the photosensitive layer forms the object wave which interferes in the photosensitive layer with the object wave and in that case at the interference nodes alters the refractive index of the photosensitive layer.

It can also be provided that the coherent light beam passes through the photosensitive layer and the master and is deflected at the rear side of the master, wherein an air layer is provided between the photosensitive layer and the master.

It can further be provided that the coherent light beam is divided into a first and a second beam portion and the first beam portion passes through the photosensitive layer and the second beam portion passes from the rear side of the master through the master. In that case the master can be formed with a transparent master layer without an additional reflection layer.

In an advantageous configuration it can be provided that the surface structures of the master are shaped in the surface, that is towards the master, of the photosensitive layer. In that way it is possible to provide an additional security feature because upon imitation both the surface structure and also the volume hologram have to be copied and association in accurate register relationship has to be implemented.

It can be provided that the master remains on the fixed photosensitive layer.

It can however also be provided that applied to the front side of the master is a transparent release layer, the refractive index of which is equal or approximately equal to the refractive index of the photosensitive layer and that then the photosensitive layer is applied to the release layer. To keep the optical influence of the release layer low, it is provided that the difference in refractive index between the photosensitive layer and the release layer is kept low or entirely avoided.

Frequently the quality of the photosensitive layer is such that there is no need to apply a release layer to the master. The release layer however can optionally be provided and can facilitate release of the master from the exposed photosensitive layer when it is intended that the master is released from the exposed photosensitive layer.

It can be provided that the photosensitive layer is used in a thickness of from 5 μm to 40 μm. The optimum thickness of the photosensitive layer is dependent inter alia on the material used and can be ascertained by tests.

It can further be provided that a photopolymer layer is used as the photosensitive layer. Photopolymers are resins which crosslink due to the action of energy-rich light, in particular UV light, and therefore polymerise. To produce volume holograms, special photopolymers are provided, the refractive index of which changes due to intense exposure such as for example OmniDex 706 from DuPont.

It can be provided that the photosensitive layer and the master are exposed by coherent light beams of differing wavelength and/or differing direction. In that way it can be provided that the items of image information stored in the volume hologram appear in different colours and/or are visible at different viewing angles.

It can advantageously be provided that the coherent light beam is afforded by a laser.

An advantageous configuration provides that the multi-layer body is produced in a roll-to-roll process by a procedure whereby the photosensitive layer is passed over a replication cylinder, on the peripheral surface of which is arranged the master, the photosensitive layer being illuminated with the coherent light beam. The roll-to-roll process is particularly advantageous for mass-production. As tests have shown the peripheral speed of the replication cylinder can be at least 5 m/min, it can be increased to at least 40 m/min. Because the multi-layer body is at rest with respect to the surface of the master, there are no losses of quality due to the rotating master. It can be provided that hardening of the photosensitive layer is effected when the multi-layer body is still in contact with the rotating master. At least the beginning of the hardening operation can be provided when the multi-layer body is still in contact with the rotating master.

It can be provided that the coherent light beam includes an acute angle with the surface normal of the replication cylinder.

An advantageous configuration provides that the coherent light beam includes an angle of 10° to 20° with the surface normal of the replication cylinder. An angle of 14° is particularly advantageous.

Further advantageous configurations of the invention are directed to the design of the master.

It can be provided that the at least one other surface structure has an asymmetrical relief structure or a symmetrical relief structure or a relief structure of a varying period or a random relief structure or a pseudo-random relief structure.

It can further be provided that the surface structures of the master which do not contain any image information are in the form of a motheye structure and/or in the form of a mirror and/or in the form of a matt structure and/or in the form of a scatter grating.

In a further advantageous configuration it is provided that the at least two surface structures are in the form of asymmetrical surface structures.

It can be provided that the k-vectors of the asymmetrical surface structures are turned through 180° relative to each other. Such an orientation of the surface structures is particularly advantageous because the different items of image information become visible by simply tilting the multi-layer body. With other positional associations, tilting and rotary movements have to be performed simultaneously or in succession to make all items of image information visible. That effect which is a hindrance in terms of simplest possible viewing can however be advantageous if for example, besides two items of image information intended for a human observer, a third item of image information is stored in the volume hologram, which is intended for an electronic reading device. That concealed image information can also be readable for example only under UV light or infrared light.

It can advantageously be provided that the asymmetrical surface structures are blaze gratings. Blaze gratings are distinguished by particular brightness because, on account of their asymmetrical configuration, they deflect as much light as possible into one of the two symmetrical diffraction orders, preferably into one of the two first orders. That is advantageous as, in the case of conventional gratings, the light is distributed to a larger spatial angle and the main component of the output is concealed in the zero order and thus remains unused.

It can preferably be provided that the blaze grating has a spatial frequency of 100 lines/mm to 150 lines/mm. The preferred blaze grating therefore has a grating line spacing of 10 μm to 6.7 μm. In especial cases however very large grating line spacings (>10 μm) and also very small grating line spacings (<1 μm) can also be preferred. Gratings with very great grating line spacings such as for example asymmetrical achromatic gratings with grating line spacings of over 10 μm can reflect all the incident light into one order. Equally, in particular with a non-normal angle of incidence of the exposure beam, it is possible to produce high-frequency gratings, in respect of which an order, for example the −1st order, negates almost all the energy of the diffracted field. The two situations are advantageous and there is no competition between the various 'object waves' (that competition potential reduces the diffraction efficiency of the volume hologram produced).

It can further be provided that the blaze grating involves a grating depth of 1 to 2 μm.

Blaze gratings involving the above-mentioned dimensions can be produced by hot embossing, for example by means of a heated embossing roller, or photomechanically by exposure of a UV hardenable lacquer.

It can be provided that the regions with the at least two items of image information are arranged in a raster grid with a grid width of 50 μm to 20 μm. Under particularly advantageous conditions, that is to say when considering high-contrast motifs, with good illumination, the limit of the resolution capability of the human eye is at 20 μm. The resolution capability can be worsened by a factor of 3 to 5 when low contrast is involved, with poor illumination. Grid widths of 20 μm to 50 μm can therefore no longer be resolved by the naked human eye so that it is not possible to perceive the rastering of the image information.

It can further be provided that the raster grid is a stripe raster grid. A stripe raster grid is particularly simple to implement. It is however also possible to provide other raster grids, in particular if more than two different items of image information are to be interlaced. The arrangement may involve for example a pixel raster grid, wherein the master can be produced by electron beam technology. The rastering effect ensures that the items of image information are also separated from each other in the volume hologram so that there are no losses in brightness and/or sharpness, due to superpositioning of items of image information in the volume hologram.

It can be provided that the master layer is formed from a transparent replication layer.

As already stated hereinbefore it can be provided that the coherent light beam incident on the photosensitive layer is reflected at the front side of the master or at the rear side thereof.

It can therefore be provided that a reflection layer is applied to the front side of the master or a reflection layer is applied to the rear side of the master.

It can further be provided that the reflection layer is in the form of a metallic layer. The metallic layer can be formed for example from a metal which is a good reflector such as aluminium, silver, gold or copper, or from a metal alloy. The metallic layer can be formed with a layer thickness of some nanometers. The layer thickness can also be so selected that it reflects in incident light and appears transparent in transmitted light. The preferred layer thickness can advantageously be determined by tests as the transparency, besides the layer thickness, depends inter alia on the material of the metallic layer and the aspect ratio of the surface structure.

If the reflection layer is provided on the front side of the master it can be provided that the master is formed from reflecting material, for example a metal which is a good reflector. The master can be for example in the form of a rotating master cylinder.

It can also be provided that the reflection layer is in the form of an optical separation layer. This can involve an inorganic dielectric such as for example ZnS.

It can further be provided that the reflection layer is in the form of an HRI layer.

It can also be provided that, instead of the reflection layer, there are provided a plurality of high-refraction dielectric layers which each involve a layer thickness of $\lambda/2$ or $\lambda/4$, wherein X denotes a light wavelength.

It can further be provided that use is made of the reflection at surfaces which interface with air or another low-refraction medium and in the case of a transparent master it is also possible in particular to dispense with the reflection layer on the rear side of the master.

The metallic layer and/or the dielectric layer and/or the thin film layer system and/or the liquid crystal layer and/or the print layer can either cover the entire surface of the photosensitive layer, they can be applied in register relationship with the images of the volume hologram as in the same way in relation to a KINEGRAM®, they can be applied in partial register relationship with the images of the volume hologram as in the same manner in relation to normal demetallisation or they can be partially applied in the form of a pattern which is not in register relationship with the images of the volume hologram. Especially if the surface relief is coated with metal or HRI material, it can acquire an optical function which supplements the volume hologram.

It can further be provided that the volume hologram is arranged in a window of a banknote or an ID card.

BRIEF DESCRIPTION OF THE DRAWINGS

The invention is described hereinafter by way of example by means of a number of embodiments with reference to the accompanying drawings in which.

DETAILED DESCRIPTION OF THE INVENTION

Figure 1A:
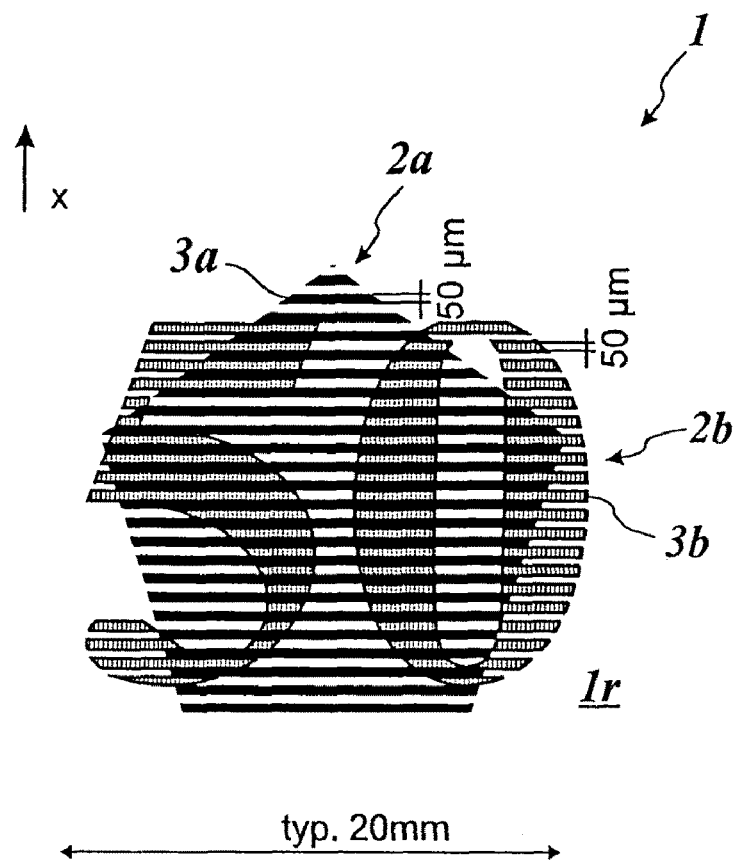
FIG. 1a shows a diagrammatic plan view of a master according to the invention for producing a volume hologram.

FIG. 1a shows a diagrammatic plan view on an enlarged scale of a master 1 for the production of a volume hologram. The master 1 can be in the form of a multi-layer body with at least one replication layer 1r which on the top side has image regions 2a and 2b formed from surface regions 3a and 3b which are in strip form and which are arranged in mutually parallel relationship. The strip-form surface regions 3a and 3b are each 50 µm in width and are arranged at a spacing of 50 µm from each other, wherein the intermediate space between the strip-form surface regions 3a is filled by the strip-form surface regions 2b and vice-versa. The strip-form surface regions 2a and 2b form interlaced line raster grids which are below the resolution capability of a naked human eye. Therefore the image regions 2a and 2b appear to the viewer as closed regions, in which respect in the embodiment shown in FIG. 1 the image region 2a is a logo and the image region 2b are alphanumeric characters.

The surface regions 3a and 3b have relief structures in the manner of a blaze grating and are provided with a reflection layer 1m. In the embodiment shown in FIG. 1a the reflection layer 1m is a thin metallic layer. Blaze gratings are special diffraction gratings in optics. The grating elements are inclined through what is referred to as the blaze angle. That leads to a step-shaped asymmetrical surface relief structure with a rising front edge which is inclined at an acute angle relative to the surface normal and a steeply falling rear edge. As can be seen from FIG. 1b the relief structures of the surface regions 3a and 3b involve identical relief structures which are arranged turned through 180° relative to each other (identified in FIG. 1b with 0° azimuth and 180° azimuth).

Because of the relief structures of the surface regions 3a and 3b, which are turned through 180° relative to each other, the image regions 2a and 2b, upon tilting of the master, appear as clearly separated image regions which in that case light up brightly.

Figure 1B:
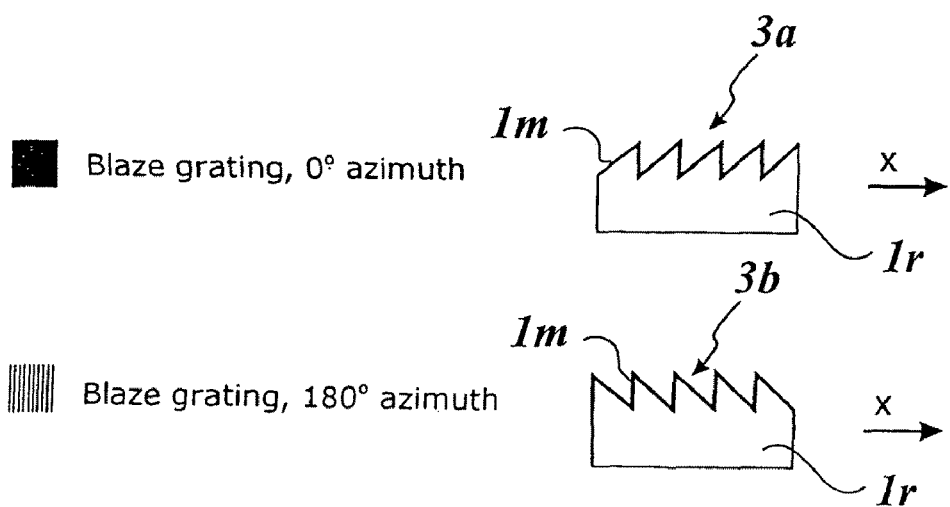
FIG. 1b shows diagrammatic detail views of FIG. 1a, FIG. 2a shows a view illustrating the principle of the process according to the invention.
Figure 2A:
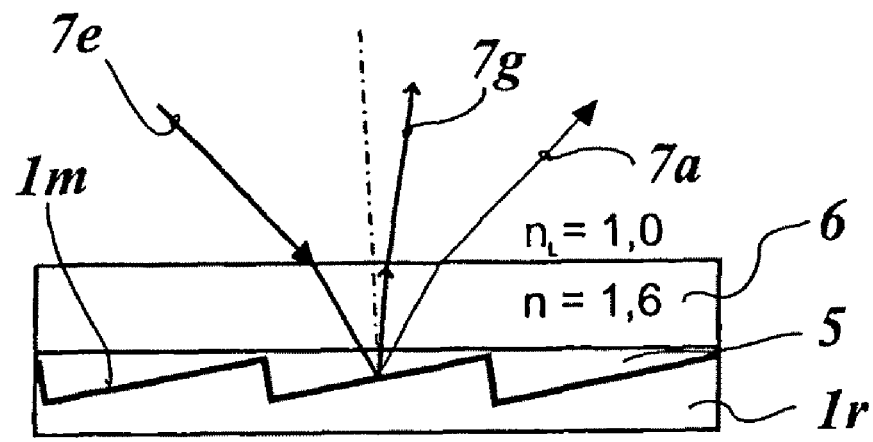
FIG. 2b shows a view illustrating the principle of the function of a volume hologram produced as shown in FIG. 2a, FIGS. 3a to 3i show diagrammatic views of production steps for a first embodiment of the production process according to the invention.

FIG. 2a now diagrammatically shows use of the master 1 of FIGS. 1a and 1b for the production of a volume hologram which has the optical properties of the master 1.

The reflection layer 1m arranged on the replication layer 1r is covered by a transparent cover layer 5 which can be a release layer which can later facilitate separation of a photopolymer layer 6 applied to the relief layer. In the illustrated embodiment the photopolymer layer 6 has a refractive index n=1.6. The photopolymer layer 6 is firstly non-crosslinked or only slightly crosslinked. Advantageously the cover layer 5 has the same refractive index or an approximately equal refractive index to the photopolymer layer 6 so that the cover layer 5 optically has no effect.

A laser beam 7e impinging on the photopolymer layer 6 for writing in a volume hologram is firstly refracted at the photopolymer layer 6 and then deflected at the reflection layer 1m by diffraction at the grating structure of the replication layer 1r. In the diagrammatic view shown in FIG. 2a the diffracted 1st-order beam is denoted by 7g while the zero order beam reflected at the illustrated edge is denoted by 7a. Because the grating structure is a blaze grating the 1st-order beam is of the highest intensity. The first-order beam embodies the object wave which interferes with the reference wave embodied by the incident beam 7e and in that case triggers local polymerisation in the photopolymer layer 6. As a consequence of polymerisation the refractive index of the photopolymer layer is changed. The changes in refractive index are localised in what are referred to as the Bragg planes which were first described in connection with the X-ray structural analysis of crystals.

Figure 2B:
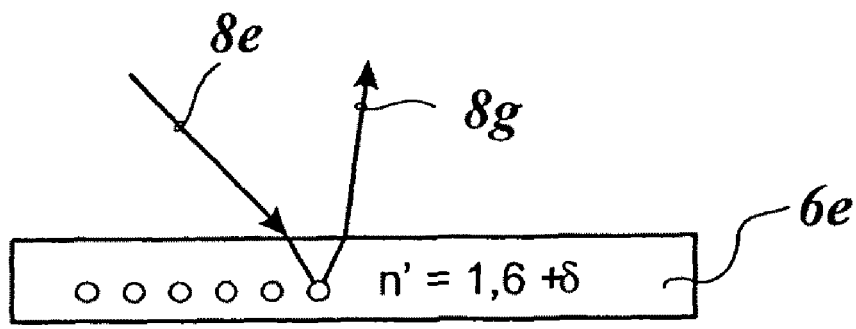

FIG. 2b now shows a photopolymer layer 6e which is the exposed photopolymer layer 6 in FIG. 2a. The photopolymer layer 6e has a position-dependent refractive index $n'=n+\delta$, whereby a three-dimensional refractive index pattern is stored in the photopolymer layer 6e in the form of a volume hologram, in which reconstruction of the interference pattern influenced by the surface structure of the replication layer 1r is permanently stored.

The photopolymer layer can be the photopolymer OmniDex 706 from DuPont, which has the specified property of a local change in refractive index due to exposure to light. Photopolymers are also known, which are in the form of a liquid substance and which for example polymerise due to the action of UV light and as a result harden. It can also be provided that the photopolymer is cast as a layer and is subjected to preliminary hardening by weak UV light action and/or is hardened after the formation of the volume hologram by the action of UV light or by a heat treatment.

In FIG. 2b a light beam impinging on the photopolymer layer 6e for reconstruction of the grating images is identified by 8e and a beam which issues from the photopolymer layer 6e and which is diffracted at the volume hologram is denoted by 8g. The beam 8g issuing from the photopolymer layer 6e corresponds in direction and strength of light to the diffracted beam 7g in FIG. 2a. To clearly illustrate the described events the nodes of one of the Bragg planes are diagrammatically represented by circles.

Accordingly the photopolymer layer 6e produced in accordance with the above-described process has an optical action which arouses the impression that there is a blaze grating having a reflecting relief structure. A volume hologram has a high level of safeguard against copying because production parameters such as the precise wavelength of the laser light and the precise exposure angles must be known to reproduce the volume hologram. Copying with polychromatic light is excluded from the outset. However copying with monochromatic light is also rendered considerably more difficult because, due to a series of causes, there is a drift of the wavelength which can be used for reconstruction relative to the original wavelength which was used when producing the volume hologram. One of the causes is shrinkage or upsetting of the Bragg gratings upon hardening of the photopolymer layer 6e. Added to that is the fact that the drift does not occur homogeneously over the entire extent of the volume hologram and also varies in production. Such deformation phenomena can further be caused by sticking on the photopolymer layer with a hot melt adhesive or can be specifically and targetedly introduced in order for example to provide the volume hologram with personalised information. Because of the described variation in the drift between the wavelength which can be used for reconstruction of the volume hologram relative to the original wavelength and further the lack of homogeneity of the drift, the level of safeguard against forgery of the volume hologram according to the invention is very high.

FIGS. 3a to 3i now show the process steps for the production of a first embodiment of the multi-layer body according to the invention.

Figure 3A:
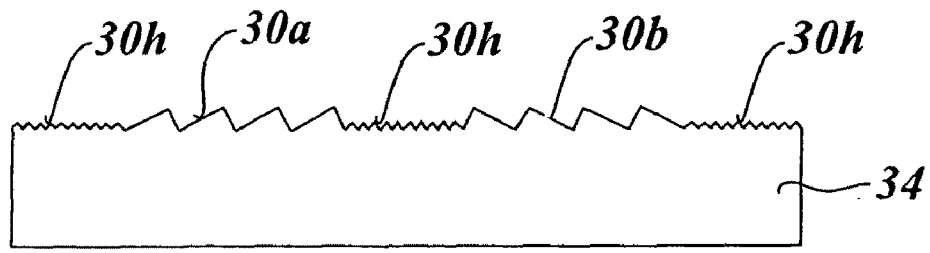

FIG. 3a is a diagrammatic view in section showing a replication layer 34 which can be formed from a thermoplastic material, in the top side of which are provided regions in which asymmetrical relief structures 30a and 30b in the form of blaze gratings are formed, the relief structures involving an arrangement turned through 180°, of the same configuration. The relief structures 30a and 30b in the embodiment shown in FIGS. 3a to 3i have a grating width of 10 µm, that is to say a spatial frequency of 100 lines/mm, and a grating depth of 2 mm, with the total thickness of the replication layer 34 being 22 µm. The top side of the replication layer 34 further has regions with a relief structure 30h forming a background region for the regions with the relief structures 30a and 30b. The relief structure 30h has a markedly higher depth-to-width ratio than the relief structures 30a and 30b, the depth-to-width ratio of which, with the above-specified parameters, is $^2/_{10}$=0.2. The relief structure 30h can for example have a depth-to-width ratio of 1 to 5. The relief structure 30h is not a blaze grating but a 'motheye' structure which absorbs the incident light and therefore appears dark to a viewer. It forms a neutral background for the images generated by the relief structures 30a and 30b. The relief structure 30h can also be a reflective flat surface, a matt structure or a grating structure which diffracts the incident light.

The dimensionless depth-to-width ratio which is also called the aspect ratio is defined as the ratio of the depth of the 'troughs' to the spacing of two adjacent 'peaks' of a preferably periodic relief structure.

Figure 3B:
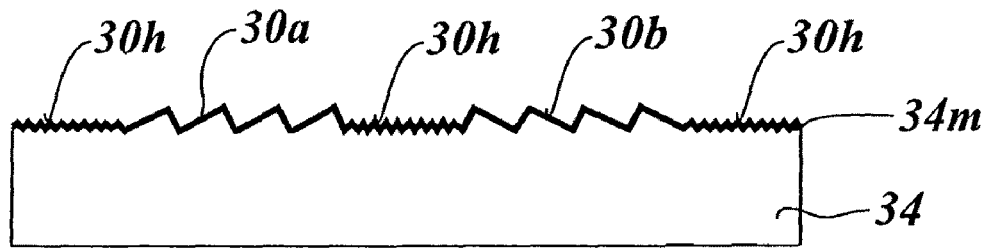

FIG. 3b now shows the replication layer 34 with a metallic layer 34m applied on the top side of the replication layer. The metallic layer 34m can be applied for example by sputtering. The metallic layer 34m can be of metals which are good reflectors such as aluminium, silver, gold or the like or it can be a metal alloy.

Figure 3C:
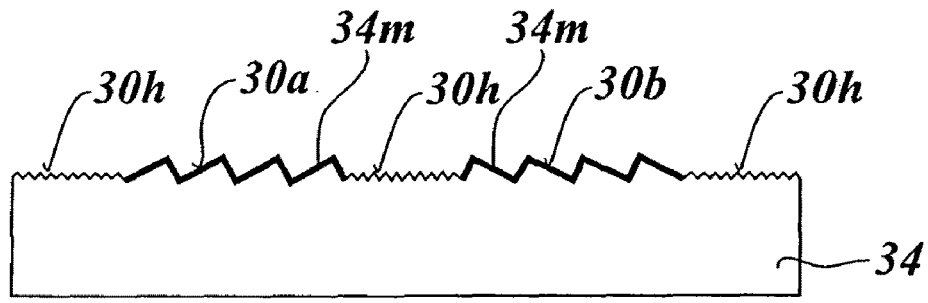

FIG. 3c now shows the replication layer 34 with the metallic layer 34m partially removed. The metallic layer is removed in the regions with the relief structure 30h which thus form non-reflecting regions. It will be noted however that it is also possible to dispense with demetallisation of the relief structure 30h because such a matt structure reflects little or not at all, because of the undirected scatter effect.

Figure 3D:
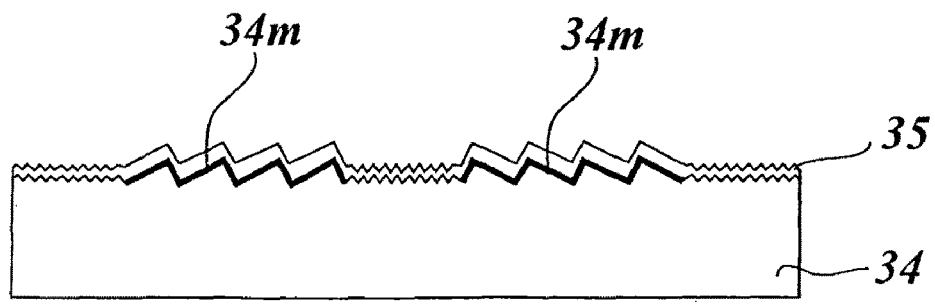

FIG. 3d now shows the replication layer 34 with the metallic layer 34m partially removed, with a release layer 35 being applied thereto.

Figure 3E:
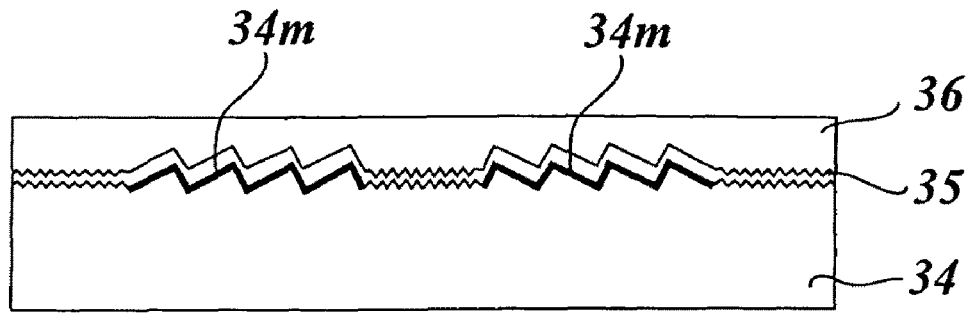

FIG. 3e shows the layers indicated in FIG. 3d, with a photopolymer layer 36 applied to the release layer 35 in a thickness of 5 µm to 20 µm. The photopolymer layer 36 has the same refractive index as the release layer 35 so that no optical diffraction occurs at the interface between the photopolymer layer 36 and the release layer 35. Depending on the consistency of the non-crosslinked photopolymer layer, after application the photopolymer layer 36 can be hardened to afford adequate stability in respect of shape, for the next processing step. For example the photopolymer layer 36 can be subjected to initial polymerisation by a preliminary exposure procedure.

Figure 3F:
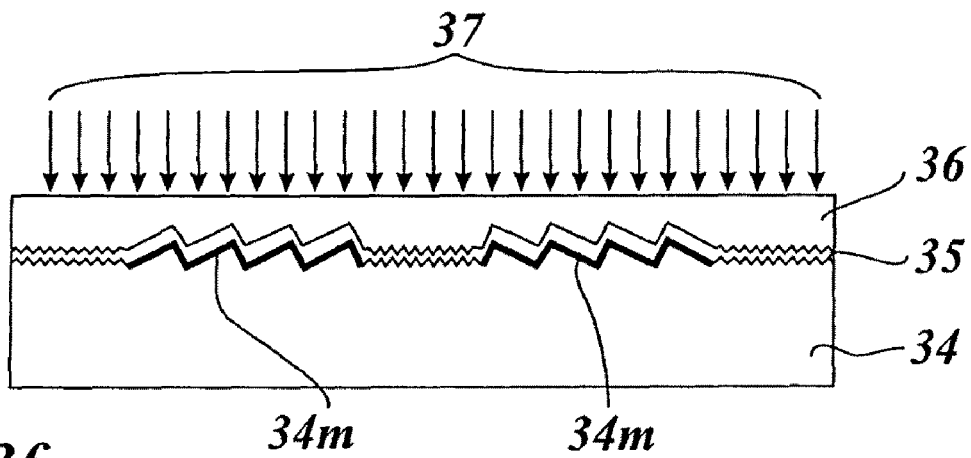

FIG. 3f now shows exposure of the photopolymer layer 36 with laser light 37. In that way, an interference pattern is produced in the photopolymer layer 36 by interference of the radiated laser light 37 (reference wave) with the laser light which is diffracted or reflected by the metallic layer 34m (object wave) and the photopolymer layer 36 is polymerised or further polymerised at the interference nodes. Consequently there the refractive index of the photopolymer layer is altered and a volume hologram is produced in the photopolymer layer 36 by a local change in refractive index. In the embodiment of FIG. 3f the beams of the laser light 37 impinge perpendicularly on the photopolymer layer 36. It can however also be provided that the beams of the laser light are directed on to the photopolymer layer 36 at an inclined angle, for example at an angle of 14° relative to the surface normal.

Figure 3G:
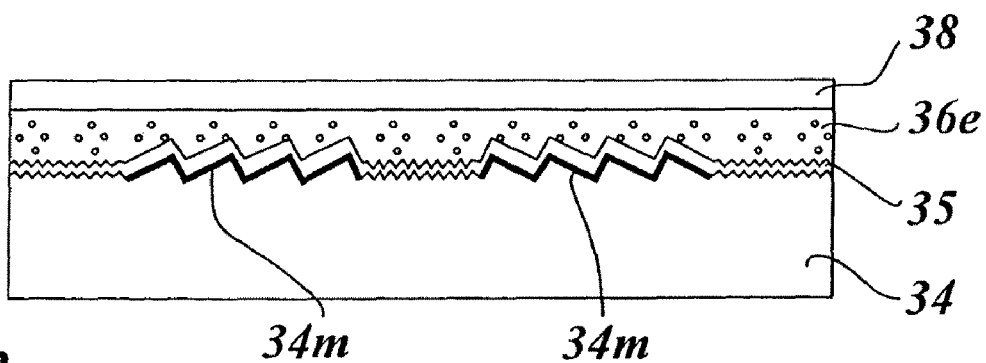
Figure 3H:
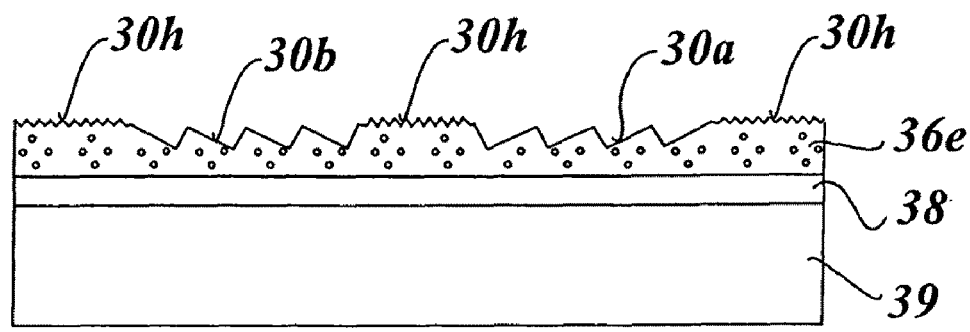
Figure 3I:
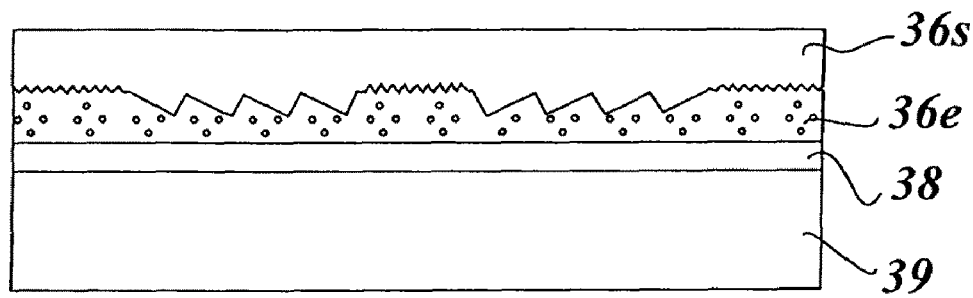

FIG. 3g shows the layer structure in FIG. 3f with the photopolymer layer 36e which has been exposed and hardened by means of UV radiation and to which an adhesive layer 38 is applied. The photopolymer layer 36 can be applied to a substrate 39, as shown in FIG. 3h, by means of the adhesive layer 38. After application of the photopolymer layer 36e and release of the replication layer 34, which is now no longer required, together with the release layer 35, the relief structures 30a, 30b and 30h are unprotected and can therefore be worn away, damaged or soiled. Accordingly there is a protective layer 36s which, as shown in FIG. 3i, covers over the photopolymer layer 36e over its full area. The side of the protective layer 36s, that is remote from the relief structures 30a, 30b and 30h, forms a smooth surface.

FIGS. 4a to 4h now show the process steps for the production of a second embodiment of the multi-layer body according to the invention.

Figure 4A:
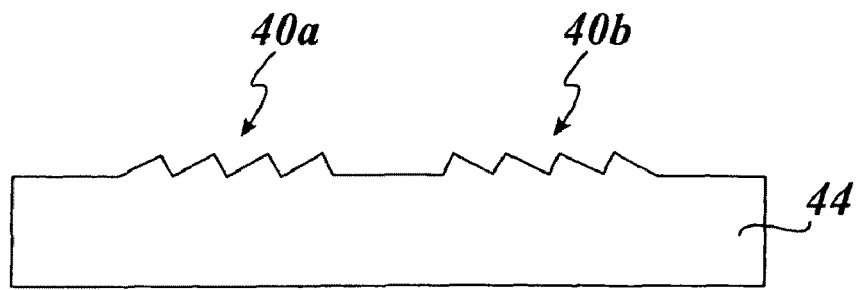
FIGS. 4a to 4h show diagrammatic views of production steps for a second embodiment of the production process according to the invention.

FIG. 4a shows a diagrammatic view in section illustrating a replication layer 44 which can be formed from a thermoplastic material and in the top side of which are provided regions in which are shaped asymmetrical relief structures 40a and 40b which are in the form of blaze gratings and which, being of the same configuration, are in an arrangement of being turned through 180°. The relief structures 40a and 40b, in the embodiment shown in FIGS. 4a to 4h, involve the same parameters as in the embodiment illustrated hereinbefore in FIGS. 3a to 3i (10 µm grating width, 2 µm grating depth, 22 µm total thickness for the replication layer 44).

Figure 4B:

FIG. 4b now shows the replication layer 44 with a metallic layer 44m applied to the top side of the replication layer. The metallic layer 44m can be applied for example by sputtering. The metallic layer 44m can involve metals which are good reflectors such as aluminium, silver, gold or the like, or a metal alloy.

Figure 4C:
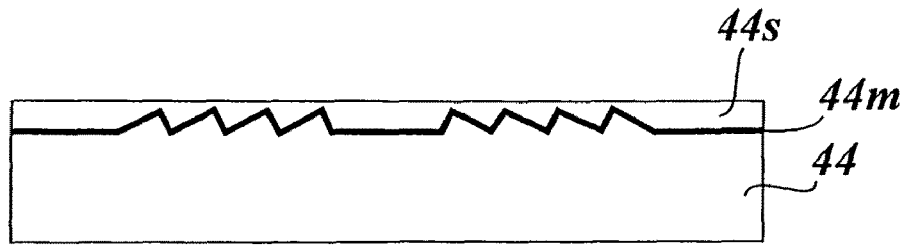

FIG. 4c now shows the layer composite comprising the replication layer 44 and the metallic layer 44m with a protective lacquer layer 44s which is applied to the metallic layer 44m in a thickness of 1 µm to 3 µm and completely fills up the relief structures 40a and 40b. The side of the protective lacquer layer 44s, that is remote from the metallic layer 44m, has a flat surface.

Figure 4D:
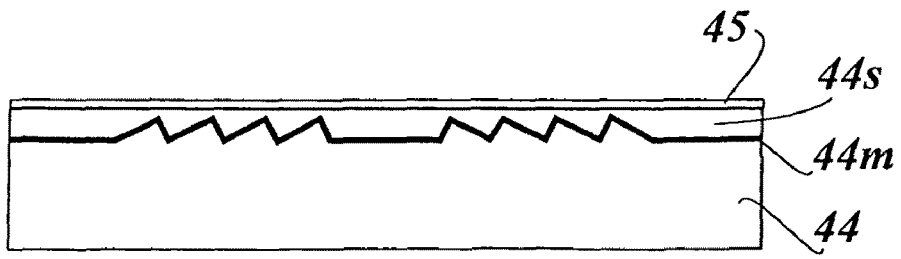
Figure 4E:
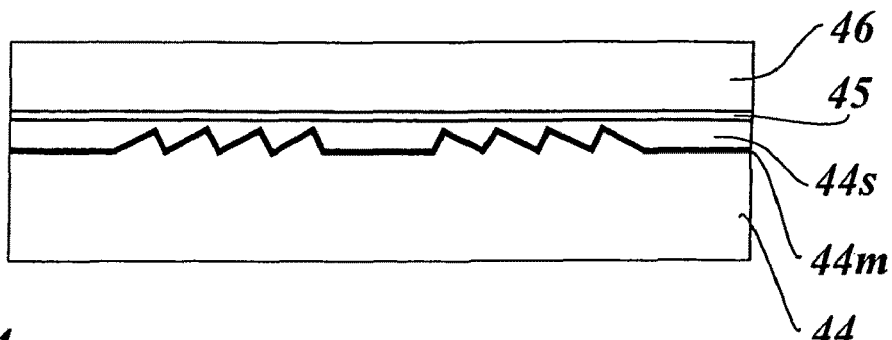

In FIG. 4d, applied to the protective lacquer layer 44s is a release layer 45 to which a photopolymer layer 46 is applied in FIG. 4e. Depending on the respective consistency of the non-crosslinked photopolymer layer, after application the photopolymer layer 46 can be subjected to preliminary hardening to afford adequate stability in respect of shape for the next processing step. For example the photopolymer layer 46 can be subjected to initial polymerisation by preliminary exposure.

Figure 4F:
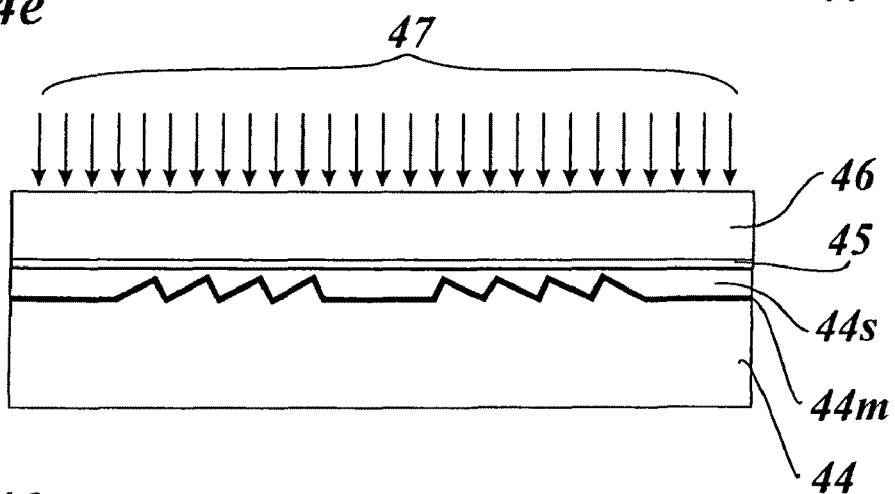

FIG. 4f shows exposure of the photopolymer layer 46 with laser light 47. In that way an interference pattern is produced in the photopolymer layer 46 by interference of the irradiated laser light 47 (reference wave) with the laser light reflected or diffracted by the metallic layer 44m (object wave) and the photopolymer layer 46 is polymerised or further polymerised at the interference nodes. Consequently the refractive index of the photopolymer layer is altered there.

Figure 4G:
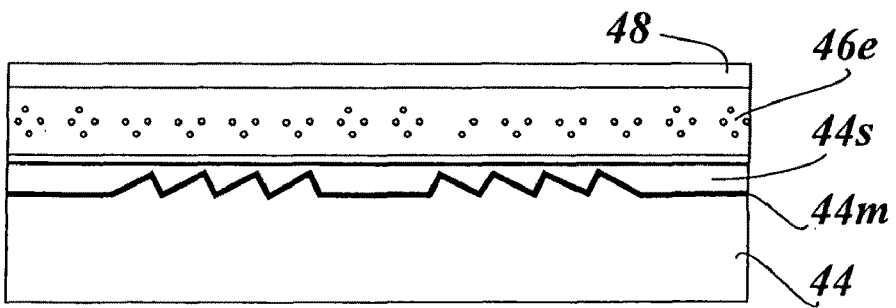

In FIG. 4g the photopolymer layer 46 is converted into an exposed and hardened photopolymer layer 46e and provided with an adhesive layer 48.

Figure 4H:
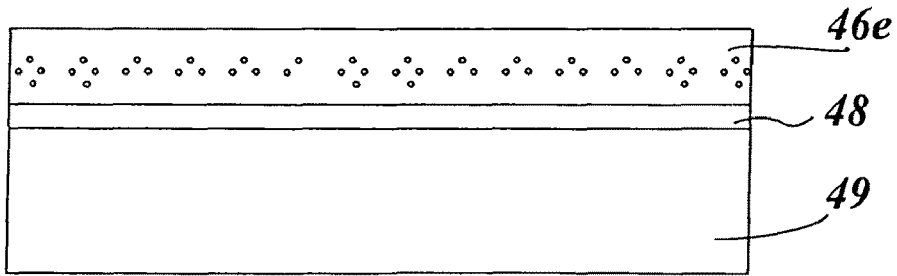

FIG. 4h now shows the hardened photopolymer layer 46e applied to the carrier substrate 49 and fixed on the carrier substrate 49 by means of the adhesive layer 48. The adhesive layer 48 can be a hot melt adhesive. The shrinkage effects, which are involved with the adhesive procedure, in respect of the developed photopolymer layer 46e can further increase the level of safeguard against forgery of the volume hologram stored in the photopolymer layer 46e because the Bragg planes of the volume hologram, that are deformed by the adhesive procedure, can at best be read out point-wise.

FIGS. 5a to 5g now show the process steps for the production of a third embodiment of the multi-layer body according to the invention.

Figure 5A:
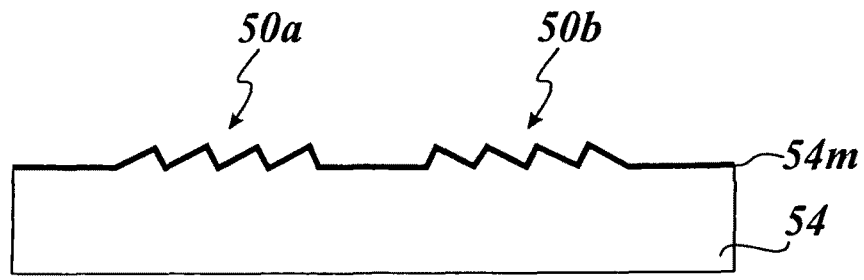
FIGS. 5a to 5g show diagrammatic views of production steps for a third embodiment of the production process according to the invention.

FIG. 5a shows a replication layer 54 of PET with regions having relief structures 50a and 50b which, as in the above-described embodiments, differ from each other substantially by their arrangement of being turned through 180° and which involve blaze gratings. The relief structures 50a and 50b however can also be of different configurations and can differ from each other for example in grating spacing and/or grating depth and/or the angle of inclination of the grating flanks. In the FIG. 5a embodiment the grating spacing of the relief structures 50a and 50b is 10 µm, the grating depth is 2 µm and the overall thickness of the replication layer 54 is less than 12 µm.

Applied to the top side of the replication layer 54, that has the relief structures 50a and 50b, is a metallic layer 54m which can be like the metallic layers in the above-described embodiments (see FIGS. 3b and 4b).

Figure 5B:
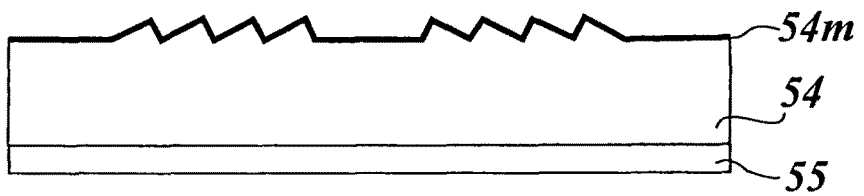

In FIG. 5b, applied to the underside of the replication layer 54 is a release layer 55, the refractive index of which is equal or approximately equal to that of the replication layer 54 so that no optical refraction occurs in the interference between the replication layer 54 and the release layer 55.

Figure 5C:
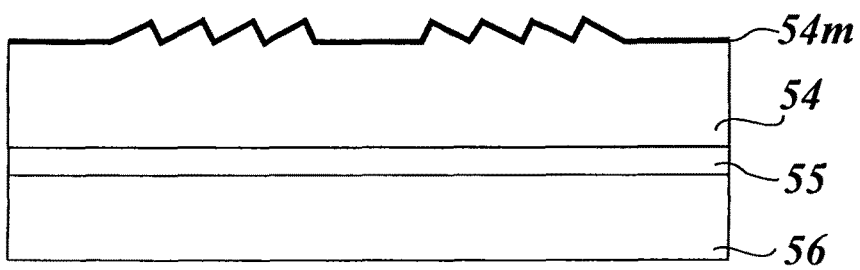

Now in FIG. 5c applied to the release layer 55 is a photopolymer layer 56 having the properties of the above-described photopolymer layers 36 (see FIG. 3e) and 46 (see FIG. 4e).

Figure 5D:
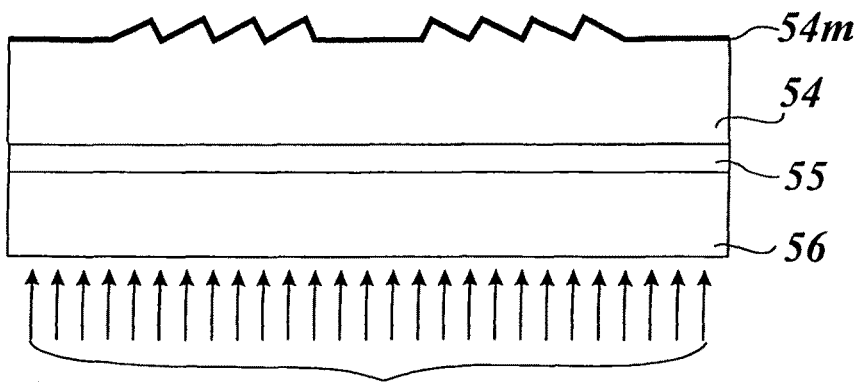
Figure 5E:
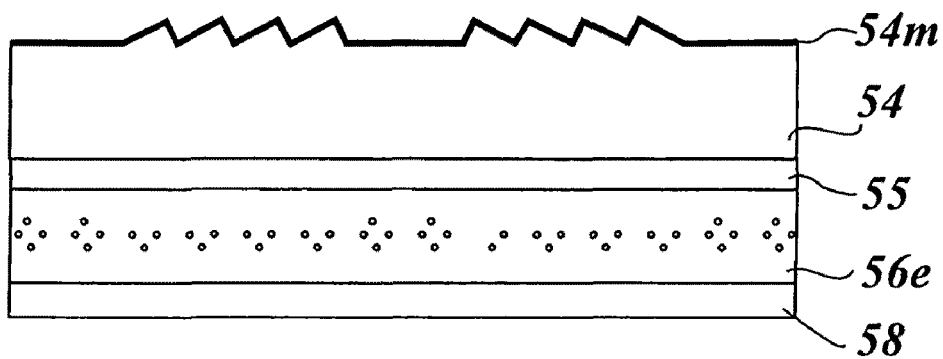

FIG. 5d shows the exposure of the photopolymer layer 56 by means of laser light 57 and FIG. 5e shows the multi-layer body which is prepared for transfer on to a carrier substrate and in which an adhesive layer 58 is applied to an exposed and hardened photopolymer layer 56e produced from the photopolymer layer 56 in FIG. 5d.

Figure 5F:
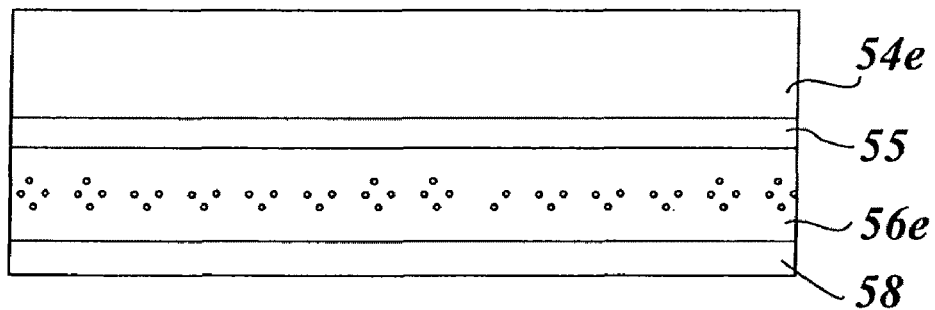

FIG. 5f shows a variant of FIG. 5e having a replication layer 54e produced from the replication layer 54 by removal of the relief structures 50a and 50b and the metallic layer 54m.

Figure 5G:
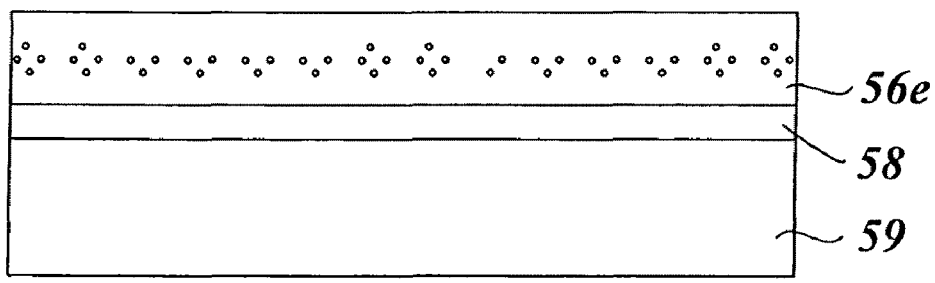

Finally FIG. 5g shows a carrier substrate 59 which can be a security document, with the hardened photopolymer layer 56e which is permanently fixed thereto by means of the adhesive layer 58.

Figure 6A:
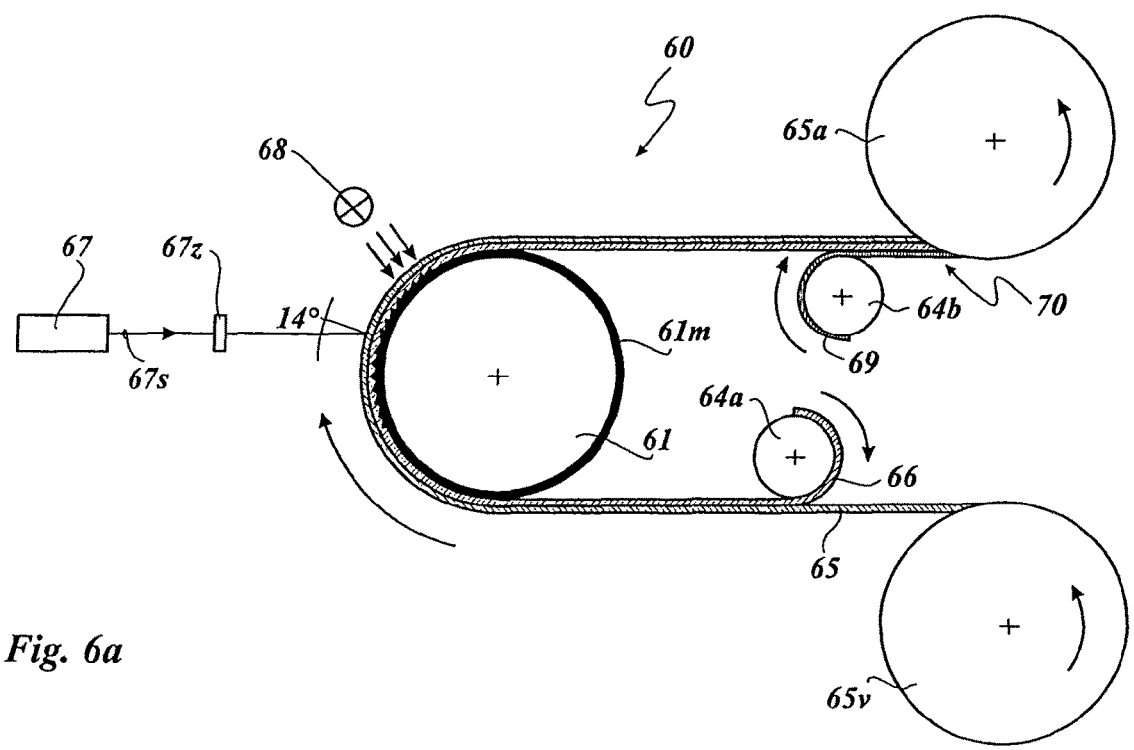
FIGS. 6a and 6b show a diagrammatic view of a production apparatus for executing a fourth embodiment of the production process according to the invention.

FIG. 6a is now a diagrammatic view showing a production apparatus 60 for the production of a fourth embodiment of the multi-layer body according to the invention. The production apparatus 60 is a production apparatus for what is referred to as the roll-to-roll process. A replication cylinder 61 is coated on its outside with a surface relief master 61m. In the FIG. 6a embodiment the replication cylinder 61 is of a diameter of 200 mm and rotates at a peripheral speed of 5 m/min. A maximum peripheral speed of up to 40 m/min can be provided.

Figure 6B:
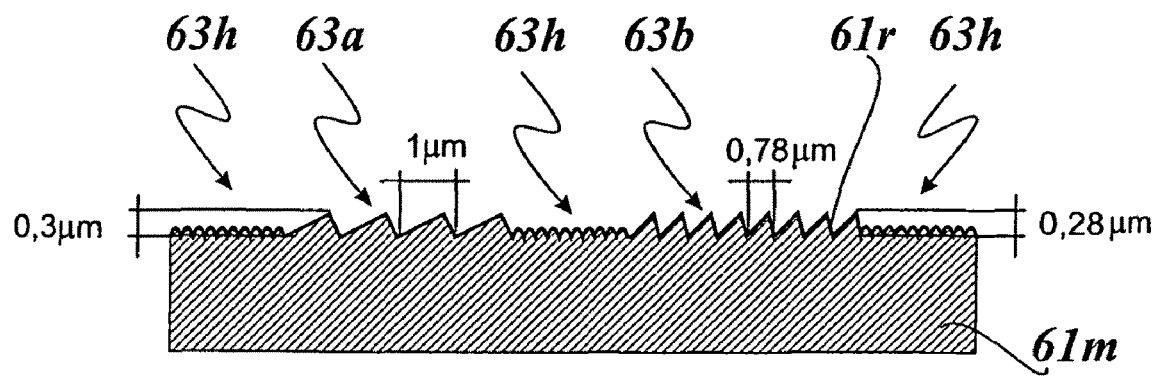

As can be seen from FIG. 6b the surface relief master 61m has a first blaze grating 63a with a grating period of 1 µm and of a grating depth of 300 nm and a second blaze grating 63b with a grating period of 0.78 µm and of a grating depth of 280 nm. The surface regions 63h of the surface relief master 61m, which are not occupied by the first blaze grating 63a or the second blaze grating 63b have a surface relief with a matt structure which diffusely scatters incident light and therefore causes the optical impression of a 'black mirror'. In this embodiment the surface relief master 61m is formed from a nickel-cobalt alloy. The surface of the surface relief master 61m is coated with a thin reflection layer 61r of a highly reflective metal, for example gold.

A transparent carrier film 65 is unwound from a supply roll 65v, passed over the replication cylinder 61 and wound on to a take-up roller 65a again. In the FIG. 7a embodiment a separation layer 65t is firstly applied to the carrier film 65 before the photopolymer layer 66 is printed thereon. The separation layer 65t can be provided to facilitate subsequent release of the carrier film 65 from the photopolymer layer.

Figure 7A:
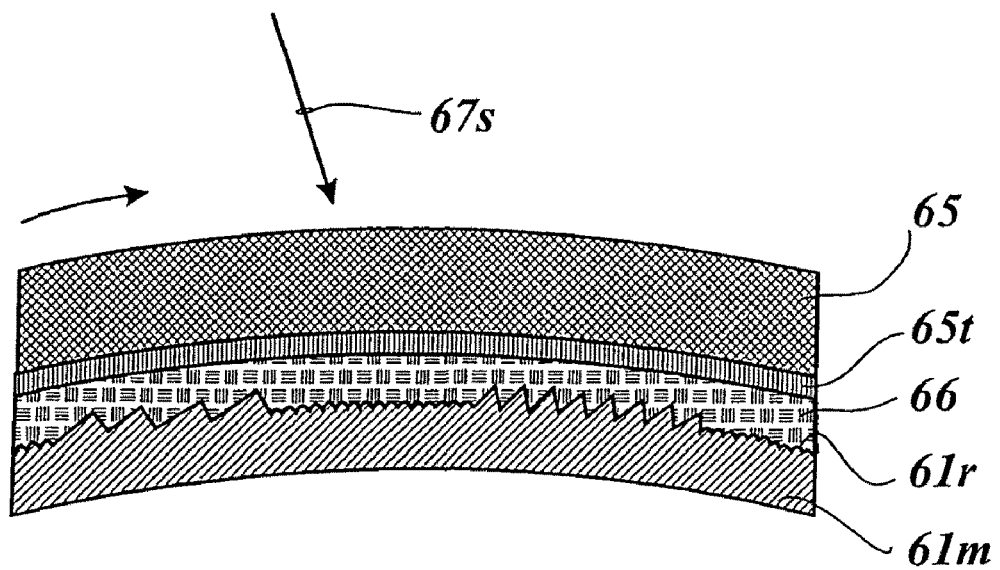
FIGS. 7a to 7d show diagrammatic views of production steps for the fourth embodiment of the production process according to the invention in FIG. 6, and FIGS. 8a and 8b show an example of use in the form of a security element in strip form.

The carrier film 65 extends around the replication cylinder 61 through 180° in the embodiments shown in FIGS. 6a and 7a, b. A viscous photopolymer layer 66 is applied by printing on the inside of the carrier film 65, that faces towards the surface relief master 61m, upstream of the replication cylinder 61, by means of a rotating printing cylinder 64a. It can be provided that a low-viscosity photopolymer layer is subjected to preliminary hardening in the printing operation or shortly thereafter by means of UV light so that the optimum viscosity for further processing is set.

Figure 7B:
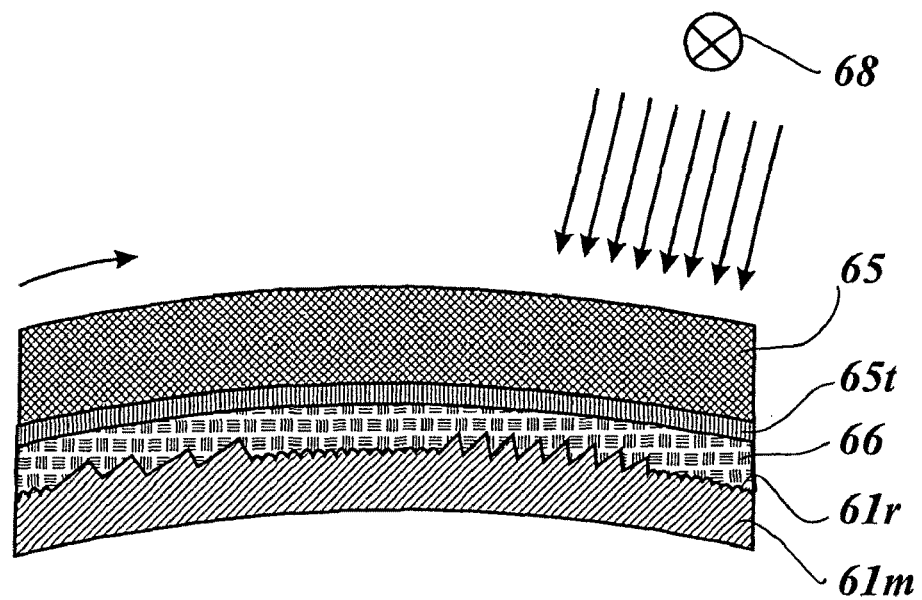

Provided for exposure of the photopolymer layer 66 is a laser 67 which emits a laser beam 67s directed on to the surface relief master 61m at an angle of 14°. That angle can be optimised for example by tests. It is dependent inter alia on the flank inclination of the blaze gratings 63a and 63b. Reflection and diffraction at the blaze gratings 63a and 63b (see FIG. 6b) result in the formation in the photopolymer layer 66 of a volume hologram which is fixed by hardening of the photopolymer layer 66 by the UV light of a UV lamp 68 arranged downstream of the laser 67 (see FIG. 7b).

Provided between the laser 67 and the replication cylinder 61 is a cylindrical lens 67z which focuses the laser beam 67s and directs it on to the surface of the surface relief master 61m. It is however also possible to provide at that location a one-dimensional scanner or a two-dimensional mask, for example a liquid crystal modulator. This can therefore also involve a shutter or a modulator which switches the laser beam on and off, desirably in register relationship with the motif of the hologram.

The modulator can for example be in the form of an electro-optical or acousto-optical modulator. The laser 67 can be a monochromatic laser or a laser with a plurality of wavelengths or a plurality of monochromatic lasers. By way of example it can be provided that the master is illuminated with a red laser beam in one regions and illuminated with a green laser beam in other regions. In such a situation of use the complication and expenditure in terms of optical system and modulator are higher than when using a monochromatic laser.

Arranged downstream of the replication cylinder 61 and upstream of the take-up roller 65a is a rotating printing cylinder 64b which prints an adhesive layer 69 on to the side of the hardened photopolymer layer 66, that is remote from the carrier film 65.

The carrier film 65, the hardened photopolymer layer 66 and the adhesive layer 69 now form a multi-layer body 70 which is then wound on to the take-up roll 65a.

Figure 7C:
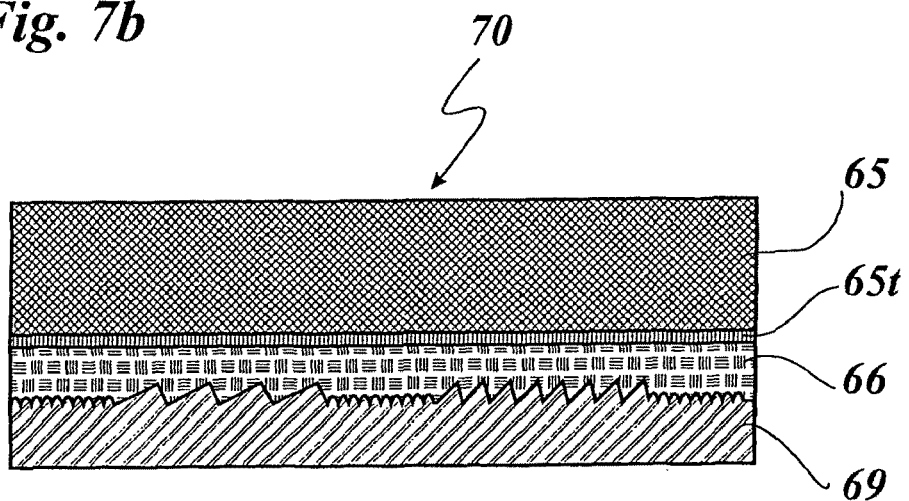

FIG. 7c shows a multi-layer body 70' which is finished for further processing and which differs from the above-described multi-layer body 70 in that a separation layer 65t is arranged between the carrier film 65 and the photopolymer layer 66.

Figure 7D:
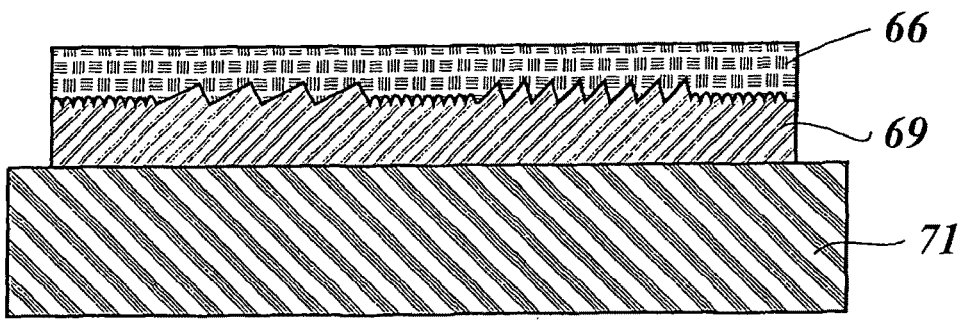

FIG. 7d now shows the photopolymer layer 66 which has been pulled off the carrier film and which is applied to a carrier substrate 71 by means of the adhesive layer 69. The carrier substrate 71 can be for example a banknote or an ID card, that is to say, a security document, the level of safeguard against forgery of which is considerably improved by the volume hologram which is shaped in the photopolymer layer 66.

Figure 8A:
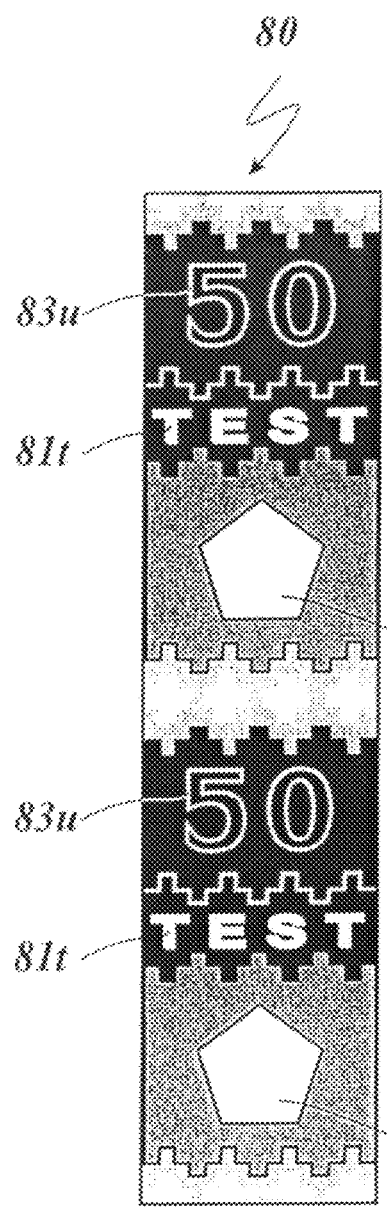
Figure 8B:
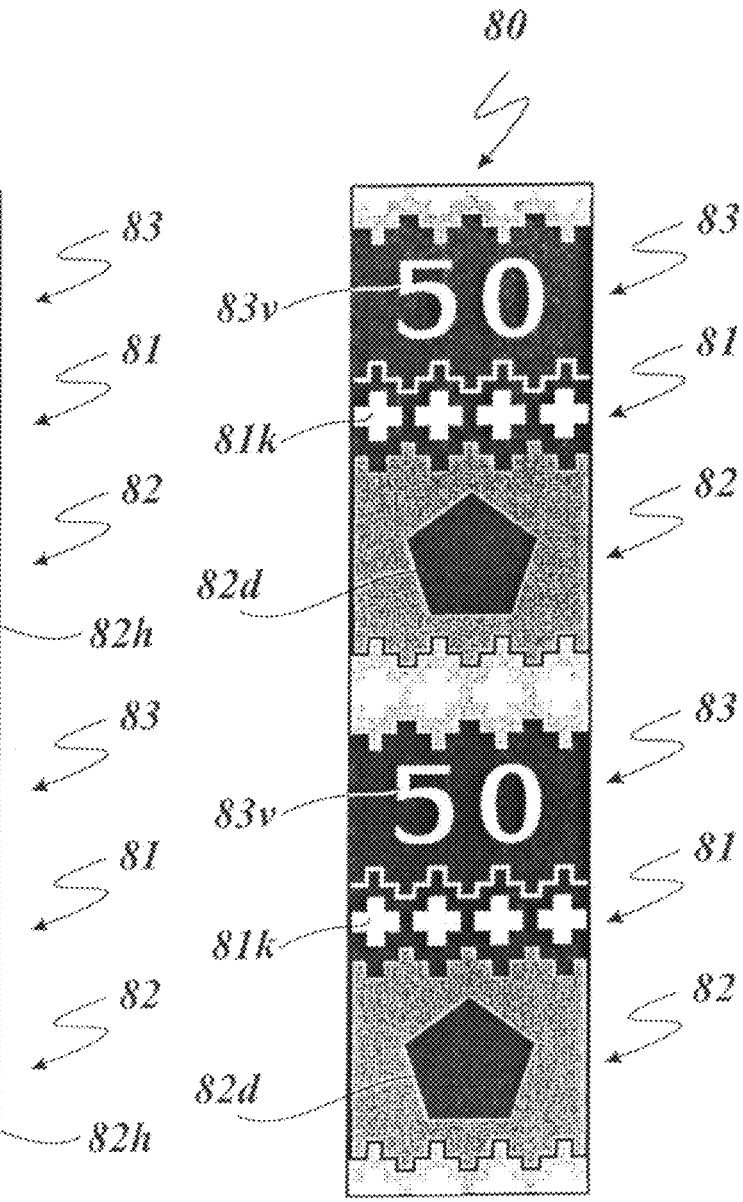

FIGS. 8a and 8b now show a strip-shaped security element 80 in two views on an enlarged scale (on the scale of 2:1), which are formed by tilting the security element 80 about a horizontal axis. The security element 80 has the following security features:

a flip image 81 formed from a first image portion 81t which reproduces a text and a second image portion 81k which reproduces a series of crosses. The two image portions 81t and 81k are rastered in strip form and are interlaced (see in that respect hereinbefore also the embodiment of FIG. 1a).

A logo 82 which in FIG. 8a appears as a light logo 82h and in FIG. 8b as a complementary dark logo 82d. The light logo 82h and the dark logo 82d are rastered in strip form and interlaced, as described hereinbefore.

To achieve that effect it can also be provided that a first surface structure forms the logo 82 and a second surface structure forms the regions outside the logo. In the first viewing position shown in FIG. 8a, in this embodiment the logo 82 appears as a light logo 82h and the regions outside the logo 82 appear dark. In the second viewing position shown in FIG. 8b the logo 82 appears as a dark logo 82d and the regions outside the logo 82 appear light. Rastering is therefore not necessary in this embodiment.

A value identification 83 which in FIG. 8a appears as an outline 83u and in FIG. 8b as a solid image 83v. The two image portions 83u and 83v of the value identification 83 are formed without rastering, the outline 83u surrounding the solid image 83v.

The invention claimed is:

1. A process for the production of a multi-layer body having a volume hologram with at least two different items of image information, wherein a single photosensitive layer of the multi-layer body is brought into contact directly or with the interposition of a transparent optical medium with the front side of a master provided on the peripheral surface of a replication cylinder, the master having shaped interlaced regions with at least two different image information surface structures which respectively contain the at least two different items of image information, wherein at least one of the image information surface structures has an asymmetrical relief structure or a kinoform structure and wherein the front side of the master further has background surface structures which do not contain any image information, said background surface structures being in the form of a motheye structure and/or in the form of a mirror and/or in the form of a matt structure and/or in the form of a scatter grating; the single photosensitive layer and the master are exposed with a coherent light beam, wherein the light beam is deflected by the at least two different image information surface structures of the master to cause local polymerization of the single photosensitive layer, whereby at least two position-dependent three-dimensional refractive index patterns are stored in the single photosensitive layer in the form of a volume hologram having at least two different items of image information, and the volume hologram introduced into the single photosensitive layer in that way is fixed by hardening of the single photosensitive layer, and wherein the multi-layer body is produced in a roll-to-roll process by a procedure whereby the single photosensitive layer is passed over the replication cylinder, the single photosensitive layer being exposed with the coherent light beam, and wherein an exposure light source and a hardening light source are both provided adjacent the replication cylinder, the exposure light source providing the coherent light beam for exposing the photosensitive layer while in contact with the master of the replication cylinder and the hardening light source providing energy for hardening the photosensitive layer while in contact with the master of the replication cylinder.

2. A process according to claim 1, wherein the image information surface structure has an asymmetrical relief structure or a symmetrical relief structure or a relief structure with a varying period or a random relief structure or a pseudo-random relief structure.

3. A process according to claim 1, wherein the at least two image information surface structures are in the form of asymmetrical surface structures.

4. A process according to claim 3, wherein at least two asymmetrical surface structures are provided with a different relief structure and/or have a different k-vector.

5. A process according to claim 1, wherein the coherent light beam comprises a plurality of coherent light beams of differing wavelength and/or with a differing direction of incidence.

6. A process according to claim 1, wherein the coherent light beam passes through the photosensitive layer and is deflected at least at the asymmetrical surface structures and/or kinoform structures of the master, wherein no air layer is provided between the photosensitive layer and the master.

7. A process according to claim 1, wherein the coherent light beam is divided into a first and a second beam portion and the first beam portion passes through the photosensitive layer and the second beam portion passes from the rear side of the master through the master.

8. A process according to claim 1, wherein the surface structures of the master are shaped in the surface, that is towards the master, of the photosensitive layer.

9. A process according to claim 1, wherein, applied to the front side of the master, is a transparent release layer, the refractive index of which is equal or approximately equal to the refractive index of the photosensitive layer and wherein the photosensitive layer is applied to the release layer.

10. A process according to claim 9, wherein the master is released from the exposed photosensitive layer.

11. A process according to claim 1, wherein the photosensitive layer is used in a thickness of from 5 µm to 20 µm.

12. A process according to claim 1, wherein a photopolymer layer is used as the photosensitive layer.

13. A process according to claim 1, wherein the coherent light beam includes an acute angle with the surface normal of the replication cylinder.

14. A process according to claim 13, wherein the coherent light beam includes an angle of 10° to 20° with the surface normal of the replication cylinder.

15. A composite comprising:
a master for the production of a volume hologram having at least two different items of image information in the optical contact process, wherein, shaped in a master layer of the master, are interlaced regions having at least two different image information surface structures which respectively contain the at least two different items of image information, wherein at least one of the image information surface structures has an asymmetrical relief structure or a kinoform structure, and wherein the master layer of the master further has background surface structures which do not contain any image information, said background surface structures being in the form of a motheye structure and/or in the form of a mirror and/or in the form of a matt structure and/or in the form of a scatter grating; and
a single photosensitive layer without a supporting substrate is in contact directly or with the interposition of a transparent optical medium with the master, wherein the single photosensitive layer is at least partially hardened, and the hardened photosensitive layer and the master are exposed with a coherent light beam prior to the application of a carrier substrate for the photosensitive layer, whereby the light beam is deflected by the at least two different image information surface structures of the master to cause local polymerization of the single photosensitive layer, whereby at least two position-dependent three-dimensional refractive index patterns are stored in the single photosensitive layer in the form of a volume hologram having at least two different items of image information, and the volume hologram introduced into the single photosensitive layer in that way is fixed.

16. A composite according to claim 15, wherein the at least one other surface structure has an asymmetrical relief structure or a symmetrical relief structure or a relief structure of a varying period or a random relief structure or a pseudo-random relief structure.

17. A composite according to claim 15, wherein the surface structures of the master which do not contain any image information are in the form of a motheye structure and/or in the form of a mirror and/or in the form of a matt structure and/or in the form of a scatter grating.

18. A composite according to claim 15, wherein the at least two surface structures are in the form of asymmetrical surface structures.

19. A composite according to claim 18, wherein the at least two asymmetrical surface structures are provided with a different relief structure and/or have a different k-vector.

20. A composite according to claim 19, wherein the k-vectors of the asymmetrical surface structures are turned through 180° relative to each other.

21. A composite according to claim 19, wherein the asymmetrical surface structures are blaze gratings.

22. A composite according to claim 21, wherein the blaze grating has a spatial frequency of 100 lines/mm to 150 lines/mm.

23. A composite according to claim 21, wherein the blaze grating is of a grating depth of 1 to 2 µm.

24. A composite according to claim 15, wherein the regions with the at least two items of image information are arranged in a raster grid with a grid width of 20 µm to 50 µm.

25. A composite according to claim 24, wherein the raster grid is a stripe raster grid.

26. A composite according to claim 15, wherein the master layer is formed from a transparent replication layer.

27. A composite according to claim 26, wherein a reflection layer is applied to the front side of the master.

28. A composite according to claim 26, wherein a reflection layer is applied to the rear side of the master.

29. A composite according to claim 27, wherein the reflection layer is in the form of a metallic layer.

30. A composite according to claim 27, wherein the reflection layer is in the form of an optical separation layer.

31. A composite according to claim 27, wherein the reflection layer is in the form of an HRI layer.

32. A process for the production of a multi-layer body having a volume hologram with at least two different items of image information, the process comprising the steps of:
providing a replication cylinder having a master arranged on a peripheral surface thereof, the master having shaped interlaced regions with at least two different image information surface structures which respectively contain the at least two different items of image information, wherein at least one of the image information surface structures has an asymmetrical relief structure or a kinoform structure, and wherein the master further has background surface structures which do not contain any image information, said background surface structures being in the form of a motheye structure and/or in the form of a mirror and/or in the form of a matt structure and/or in the form of a scatter grating;
passing a single photosensitive layer over the master of the replication cylinder using a roll-to-roll process whereby the single photosensitive layer is brought into contact directly or with the interposition of a transparent optical medium with the master;

exposing the single photosensitive layer and the master with a coherent light beam provided by an exposure light source disposed adjacent the replication cylinder, wherein the light beam is deflected by the at least two different surface structures of the master to cause local polymerization of the single photosensitive layer while in contact with the master of the replication cylinder, whereby at least two position-dependent three-dimensional refractive index patterns are stored in the single photosensitive layer in the form of a volume hologram having at least two different items of image information;

hardening the single photosensitive layer with a hardening light source disposed adjacent the replication cylinder, the hardening light source providing energy for hardening the photosensitive layer while in contact with the master of the replication cylinder to fix the volume hologram introduced therein; and laminating the single photosensitive layer with a substrate to form a multi-layer body.

* * * * *

UNITED STATES PATENT AND TRADEMARK OFFICE
CERTIFICATE OF CORRECTION

PATENT NO. : 8,187,771 B2
APPLICATION NO. : 12/226080
DATED : May 29, 2012
INVENTOR(S) : Staub et al.

It is certified that error appears in the above-identified patent and that said Letters Patent is hereby corrected as shown below:

IN THE SPECIFICATION:

Column 7, line 6, now reads "wherein X denotes"

should read -- wherein $\lambda$ denotes --

Signed and Sealed this
Twenty-third Day of July, 2013

Teresa Stanek Rea
*Acting Director of the United States Patent and Trademark Office*